July 15, 1930.  H. STEINRÜCK  1,770,585
SCREW TAP
Filed Jan. 2, 1926
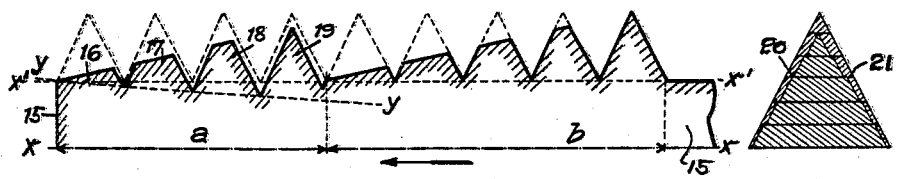
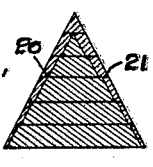
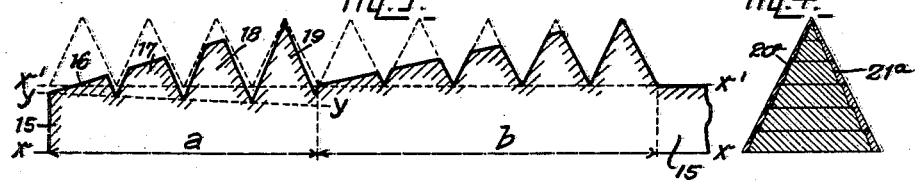
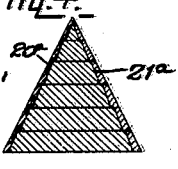
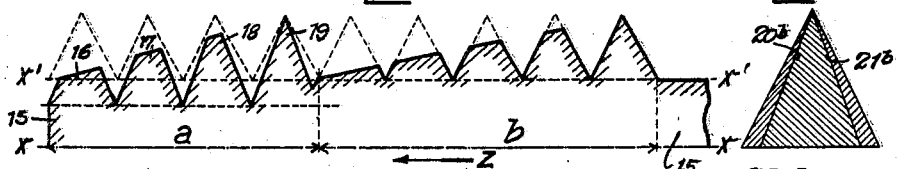
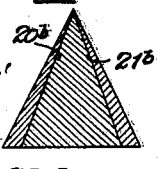
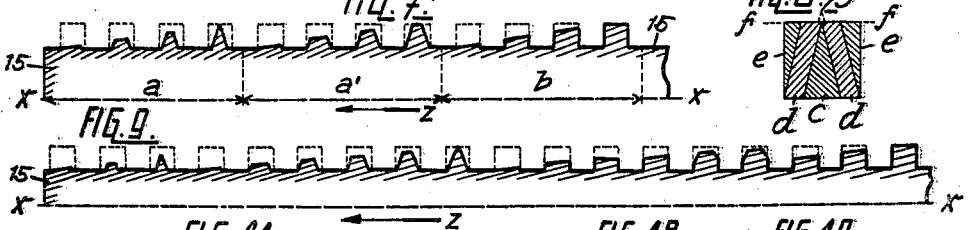
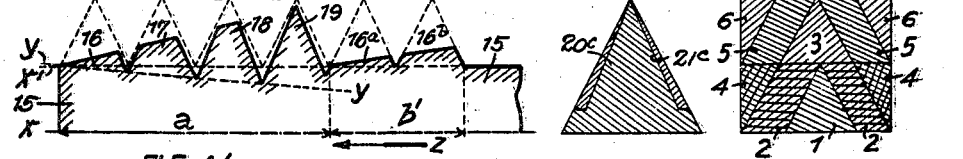
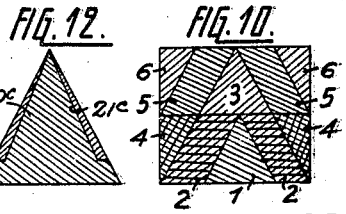
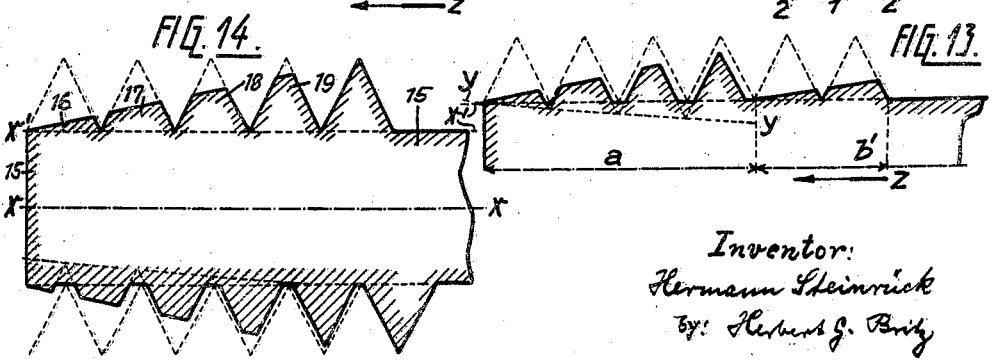
Inventor:
Hermann Steinrück
By: Herbert G. Britz
Attorney.

Patented July 15, 1930

1,770,585

UNITED STATES PATENT OFFICE

HERMANN STEINBÜCK, OF BERLIN, GERMANY

SCREW TAP

Application filed January 2, 1926, Serial No. 78,870, and in Germany January 19, 1925.

Screw taps with alternately wide and narrow teeth are for the purpose of cutting the screw-thread passage with the narrow teeth, while the wide teeth finish to the desired dimensions the previously out thread flanks. The advantage of this screw tap resides in the fact that the narrow teeth run with a considerably diminished flank friction. In screw taps of this type narrow and wide teeth follow one another within one thread passage. There are however also screw taps known in which advance-cutters with narrow teeth and after-cutters with the full profile follow behind one another in one bolt. Under these circumstances there are no free-cutting teeth because the advance-cutter and the after-cutter, each cut out their own threads, which deviate from each other only in diameter.

The object of the present invention is to improve such screw taps in such a manner as to enable the teeth of the advance cutter member to cut freely, while the flank parts left standing are removed by the after-cutter. This result is obtained according to the invention by the fact that the thickness of the teeth on the advance-cutter member, measured on the core diameter of the finished thread, diminishes in a direction opposite to the direction of cutting, as a result of which the flanks of the subsequent teeth run without flank contact in the passage previously cut and deepen it from time to time with a narrower tooth by the amount of the increase in the height of the tooth.

The advance-cutter then can not jam in the advance-cutter passage.

In the case of a screw tap of this type the advance-cutter produces a stepped thread, which is finished with the full profile by the after-cutter. The diameter of the base surface of the core-cone can be the same as the diameter of the core-cylinder, but said diameter also can be smaller than that of the core-cylinder. The first teeth may have the pitch diameter of the thread to be cut, which however may also be somewhat smaller in order that the after-cutter may have more material to work on. The advance-cutter and the after-cutter might form a set of taps, but might be united one behind the other upon one bolt to form a stepped tap, as in the second example referred to as being known. If the advance-cutter and the after-cutter are separated taps of a set, it is advisable to repeat the profile of the first teeth of the after-cutter in the case of a few teeth of the advance-cutter in order that the after-cutter may remove the material on both flanks uniformly.

Owing to the diminution in the core diameter in consequence of the core cone directed in the direction opposite to the direction of cutting in the case of the advance-cutter the external diameter also decreases rearwardly, so that the last teeth of the advance-cutter do not cut the thread right up to its full depth and the first teeth of the after-cutter still have to remove the entire breadth of the tops of the threads. It is more advantageous also to let the advance-cutter engage as far as possible right to the full depth of the thread in order that the after-cutter may only have to remove fine lateral shavings on the entire height of the thread. This can be attained in a further development of the invention by giving the advance-cutter part a rather acute angle of thread as compared with the after-cutter.

This construction however can also be employed in combination with a cylindrical thread core. A free-cutting advance-cutter member with smaller pitch diameter than the after-cutter but with the same angle of thread is obtained on the advance-cutter part of the stepped tap, as known in the case of ordinary screw taps, narrower and broader teeth alternate with each other.

The invention is diagrammatically illustrated in the accompanying drawing in several constructional examples.

Fig. 1 shows an advance-cutter and an after-cutter united in one bolt as step tap, in the advance-cutter of which the tooth thickness, measured on the core cylinder of the finished thread, decreases in the direction opposite to the direction of cutting.

Fig. 2 shows a diagrammatic thread cross-section of the same, and shows, that the flank angle of the advance-cutter is the same as that of the after-cutter.

Figs. 3 and 4 show a modification, in which the angle of thread of the advance-cutter is smaller than that of the after-cutter or that of the finished thread respectively.

Fig. 5 shows the form of construction of a screw tap with cylindrical core and acute angle of thread of the advance-cutter, while Fig. 6 shows the thread cut by the advance-cutter and after-cutter.

Fig. 7 shows a step tap for coarse flat thread, while

Fig. 8 illustrates the cutting out of the material.

Fig. 9 shows a step tap for such flat threads, which can be cut out only with difficulty or not at all in one operation so that the threads are distributed on two steps.

Fig. 10 shows the associated cross-section.

Fig. 11 shows the employment of the invention in the case of the advance-cutter of a set of taps with a few first teeth of the after-cutter following behind the advance-cutter.

Fig. 12 shows the associated cross-section.

Fig. 13 is another example of this type, and

Fig. 14 is a diagram for an advance-cutter with alternately wide and narrow teeth, which are mounted together on one core cylinder.

According to Fig. 1, the advance-cutter and the after-cutter, $a$ and $b$ respectively, are placed one behind the other as step tap in one bolt. In the case of the advance-cutter $a$ the pitch diameter of its thread and accordingly the base of the teeth measured on the core cylinder 15 according to the line $x'-x'$ of the finished thread decreased backwards, that is, in the direction of the line $y-y$, opposite to the direction of cutting (arrow $z$) of the tap, or in other words the line $y-y$ is inclined to the central axis $x-x$ and the core of the thread forms a cone which tapers rearwardly. That means the teeth 16, 17, 18, 19, decrease in this range in breadth measured on line $x'-x'$ or on the core cylinder. Under these circumstances the line $y-y$ may intersect the core cylinder of the finished thread on the peripheral line $x'-x'$ at the beginning of the tap. This retraction increases with the following teeth 16, 17, 18, 19 from which there result step-shaped flanks 20 and 21 of the thread worked out by the advance-cutter as shown in Fig. 2. The last teeth of the advance-cutter would not reach the full height of the finished thread. The full height may be reached if the angle of thread of the teeth (the thread angle enclosed between the sides 20 and 21 of Fig. 2, or $20^a$ and $21^a$ of Fig. 4) of the advance-cutter $a$ according to Figs. 3 and 4 is made smaller than that of the finished thread. A step-shaped thread-flank is then also produced, in which, however, the advance-cutter cuts out the material up to the full height of the finished thread.

While maintaining the smaller angle of thread on the advance-cutter according to Figs. 3 and 4 the rearwardly reduced core cone as in Figs. 1 and 2 may be abandoned. There then results a screw tap according to Fig. 5. Under these circumstances the last teeth of the advance-cutter $a$ increase to the full height of the finished thread. There is then produced by the advance-cutter no longer a step-shaped but a uniformly increasing screw-thread as shown at $20^b$ and $21^b$ in Figure 6.

The cutting up to the full height of the thread with the advance-cutter $a$ also, of course, admits of being employed in the case of a flat thread. In the case of finer threads it is under these circumstances possible to succeed with one advance-cutter which at the base already extends across the full width of the thread. In the case of threads which are coarser in proportion to the core, the thread breadth is preferably distributed upon a number of advance-cutters. The first advance-cutter $a$ (Fig. 7) would then take out the part $c$ in Fig. 8, beginning from the middle of the finished thread tooth, and the following advance-cutter or cutters $a'$ would shave off the laterally symmetrically adjacent parts $d$, until the after-cutter removes the remaining parts $e$ and attains the full profile. Coarse threads which do not admit of being cut to the full height of the thread in one operation, for the tap may be destroyed are sub-divided in height on the step tap according to Fig. 9, the thread-steps being cut from the centre outwards, that is, in the order 1, 2, 4, 3, 5 and 6 in Fig. 10. In this case it is not necessary to give a finished cut to each step individually, but the centres of the following steps can already be worked in succession before the side parts of the preceding steps are cut, for example in the order, 1, 2, 3, 4, 5 and 6 of Fig. 10. The central part of the flat thread at $g$ may preferably be cut into the base of the internal thread that means beyond the line $f-f$ as indicated at $g$, Fig. 8, in order to obtain reliably a severing of the wide shaving to be removed by the after-cutter. This has the further advantage that by this means a lubricating groove is produced.

If the advance-cutter and the after-cutter are not united in one bolt, the separate after-cutter might cut into the previously cut thread on one side. In order to prevent this some teeth on the advance cutter are shaped equal to the after cutting teeth. These teeth might follow immediately the advance-cutter, as shown at $16^a$ and $16^b$ in Fig. 11. The cutter in Fig. 11 is therefore the same as in Fig. 3 part $a$ and its first teeth of part $b$. The thread cut by the advance-cutter then presents the appearance shown at $20^a$ and $1$ 21ᶜ in Fig. 12, so that the first teeth of the after-cutter admit of being introduced symmetrically into the broad base of the preliminary cut.

If the tooth base of the screw tap according to Fig. 11 is cut into the core cylinder an undesirable weakening of the core might occur in many cases. This can be avoided, when its thread is cut in only as far as the diameter of the bore hole, that is, to the line $x'—x'$, as indicated in full lines in Fig. 13. Under these circumstances the symmetrical position of the thread teeth may be ensured by the fact that the lathe tool cutting the thread on the screw tap cuts axially one flank with greater and the other with less inclination than corresponds to the central position of the thread teeth. On the other hand a combined tool might be employed instead, which would permit its two cutting edges which work the flanks of the screw tap gradually to approach or recede from one another during the producing process. The before mentioned weakening of the core furthermore can be diminished if the advance-cutter has alternately narrow and broad teeth, in this case the weakening occurring only on several of the cutting edges. Even this can be done away with, when the teeth do not cut into the core cylinder, as shown in Fig. 14. In this case the two cutting edges of the tool must then approach and recede from one another several times during one passage in order to enable the broad teeth to be produced at the desired position. By this means is then produced a new form of such screw taps, which in the case of a cylindrical core are turned off on both sides on the narrow teeth, so that the narrow tooth runs symmetrically in the thread groove produced by the broad tooth. This form of screw tap with broad and narrow teeth in the case of a cylindrical base also admits of being obtained by finish-turning each toothed flank individually, in which case as soon as the cutting tool comes to the high tooth it is retracted by a cam.

Recapitulated from the above specification there result the following variations of screw-taps according to my invention:

1. In the advance-cutting part: decreasing pitch diameter in the cutting direction, the thread angle being the same as in the after-cutting part (Figs. 1 and 2). The depth of the thread will not be full cut out by the advance-cutting part.

2. In the advance-cutting part: decreasing pitch diameter, the thread angle being smaller than that of the after-cutting part (Figs. 3 and 4). The depth of the thread will be full cut out by the advance-cutting part.

3. In the advance-cutting part: the pitch diameter being equal over all the teeth but smaller than the pitch diameter of the after-cutting part, and with a smaller thread angle (Fig. 5). The depth of the thread will be full cut out by the advance-cutting part.

Screw taps of the kind hereinbefore described are suitable for the manufacture of all screw thread profiles.

I wish it to be understood that the constructional forms shown in the drawing are mere examples. There may be variations as regards the width, height and inclination of the teeth, and their dimensions and relative positions may be chosen as best suited for the particular purpose in view.

I claim:

1. In a screw tap the combination of a thread core with advance-cutting and after-cutting parts, said parts following each other on said thread core and the tooth base on the advance-cutting part measured on the core cylinder of the finished thread decreasing toward the rear end, the core of the advance cutter tapering rearwardly to the axis of the tap.

2. In a screw tap, the combination of a thread core with advance-cutting and after-cutting parts, said parts following each other on said thread core and the tooth base on the advance-cutting part measured on the core cylinder of the finished thread decreasing toward the rear end, and the thread angle of the advance-cutter being smaller than that of the after-cutter.

3. In a screw tap, the combination of a thread core with advance-cutting and after-cutting parts, said parts following each other on said thread core and the tooth base on the advance-cutting part measured on the core cylinder of the finished thread decreasing toward the rear end and the advance cutting teeth being followed only by the first teeth of the after cutting part.

In testimony whereof I affix my signature.

HERMANN STEINRÜCK.